Dec. 5, 1939.    C. C. SHUTT    2,182,646
POLYPHASE ALTERNATING CURRENT MOTOR
Filed July 9, 1938

WITNESSES:
C. J. Weller.
F. P. Lyle

INVENTOR
Charles C. Shutt.
BY O. B. Buchanan
ATTORNEY

Patented Dec. 5, 1939

2,182,646

UNITED STATES PATENT OFFICE 2,182,646

POLYPHASE ALTERNATING CURRENT MOTOR

Charles C. Shutt, Lima, Ohio, assignor to Westinghouse Electric & Manufacturing Company, East Pittsburgh, Pa., a corporation of Pennsylvania Application July 9, 1938, Serial No. 218,302

10 Claims. (Cl. 172—274)

The present invention relates to the primary or armature windings of polyphase alternating current motors of either the asynchronous or synchronous type and, more specifically, it provides a simplified connection of the winding for starting such motors.

When an induction motor is started from rest, the initial inrush or starting current is much larger than the normal full load current. It is desirable to keep this starting current as low as possible, since the leads, protective devices and control equipment of the motor must be designed to carry this current, even though it lasts for only a short time. Various expedients have been used for the purpose of reducing the starting current, such as energizing only a part of the primary winding for starting, and connecting the rest of the winding after the motor has come up to speed. None of these expedients are entirely satisfactory, however, because of complication in the connection of the windings or in the required switching equipment, or for other reasons.

Synchronous motors are often started as induction motors, using the damper winding as a squirrel-cage secondary, and when started in this manner, the same considerations as to starting current apply to motors of this type, and similar means must be used to reduce the starting current.

The object of the present invention is to provide a simplified arrangement for reducing the starting current in polyphase alternating current motors of either the induction or synchronous type.

A more specific object is to provide a primary or armature winding for either asynchronous or synchronous machines, the starting connection of which is arranged to materially reduce the starting current and to be easily changed to the desired running connection.

These objects are attained by providing a polyphase winding which normally has a parallel star connection, but which can be easily changed to a series delta connection during the starting period, or at least during the greater part of the starting period. This materially reduces the starting current because of the higher armature leakage reactance of the delta connection.

Figure 1:
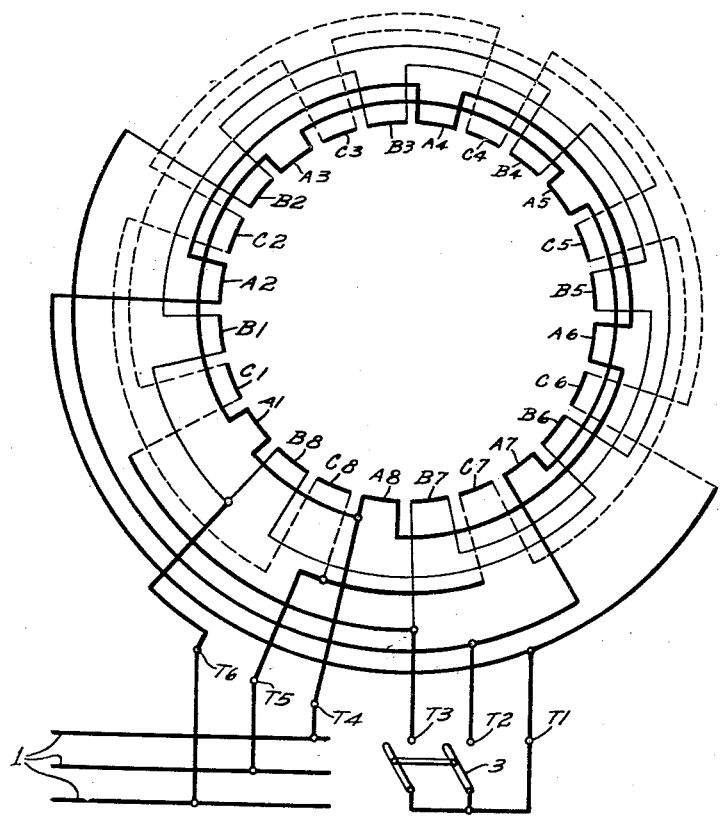
Figure 2:
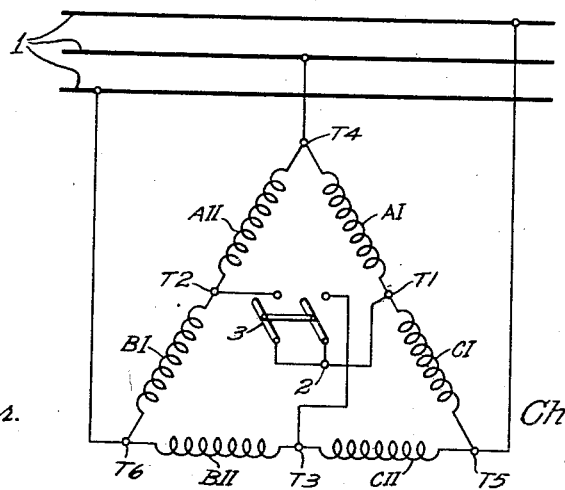

The invention will be more fully understood from the following detailed description, taken in connection with the accompanying drawing, in which:

Figure 1 is a wiring diagram showing the arrangement of the armature winding, and Fig. 2 is a simplified diagram showing the connections of the different parts of the winding.

The drawing shows a primary winding for a three-phase, eight pole machine which may be either an induction motor or a synchronous motor. It will be understood, of course, that the winding may be arranged for any desired number of poles. Referring to Fig. 1, the winding consists of a plurality of groups of armature coils, each group comprising a suitable number of individual coils placed in slots in a stator core member and connected to each other in any desired manner. The groups of coils are connected together to form a distributed, three-phase winding and the groups forming the three phases are designated on the drawing as A1, A2—A8, B1, B2—B8 and C1, C2—C8, respectively. The groups of coils of each phase are connected to form two sections or branches of the phase winding, one section consisting of the even numbered groups of coils and the other of the odd numbered groups. Thus, in phase A, the groups of coils A2, A4, A6 and A8 are connected in series between the terminals T1 and T4, while the groups A1, A3, A5 and A7 are connected in series between the terminals T2 and T4. Similarly, in phase B the groups B2, B4, B6 and B8 are connected between the terminals T2 and T6, while the groups B1, B3, B5 and B7 are connected in series between the terminals T3 and T6. Likewise, in phase C the groups C8, C2, C4 and C6 are connected between the terminals T1 and T5, and the groups C1, C3, C5 and C7 are connected between the terminals T3 and T5. In order to facilitate understanding of the drawing, the connections between the coils of phase A are shown by heavy solid lines, those between the coils of phase B by light solid lines, and the connections between the coils of phase C are shown by dotted lines.

The external connections of the motor are more clearly shown in Fig. 2, in which the two sections or branches of each phase are designated as AI, AII, BI, BII, CI and CII, respectively. It will be seen from this figure that the terminals T4, T5 and T6 are connected to a three-phase line I, from which the motor is energized. When the motor is running, the terminals T1, T2 and T3 are connected together to a neutral point 2, which results in the formation of a star connection having two parallel branches in each phase. For starting the motor, however, the connections to the neutral point are interrupted, forming a delta connection having one section of each of two different phases on each side of the delta. A two-pole switch 3 is preferably provided for interrupting the connections to the neutral point, thus providing a very simple and inexpensive means for performing the necessary switching operation.

With this arrangement of the armature winding, a parallel star connection having 60° phase belts is provided during operation of the motor, while, for starting, a series delta connection with 120° phase belts is used. This delta connection has higher armature leakage reactance than the star connection and therefore gives a corresponding reduction in the starting current. The magnitude of this difference in leakage reactance depends on the pitch of the winding and is greater for smaller pitches. A full pitch winding would have no difference in leakage reactance between the two connections, and as the pitch of the armature coils is decreased, the change in reactance becomes greater. It is therefore desirable to use as small a coil pitch as is consistent with other design factors.

In starting the motor, the switch 3 is opened and the line switch is then closed to energize the primary winding. When the motor has attained a sufficiently high speed, which may be somewhat below its full load speed, the switch 3 is closed to change to the star connection for running. In the case of a synchronous motor, of course, the direct current field winding must be energized shortly before the motor reaches synchronous speed, and the switch 3 may be closed to change to the running connection either before or after the field is excited, depending on the nature of the load and whether or not the starting connection would develop sufficient torque to pull the motor into synchronism. With high inertia loads, it will usually be necessary to change to the higher torque star connection before the field is excited, i. e., shortly before the end of the starting period.

It will be apparent that this connection provides a very simple means of reducing the starting current without requiring any undue complication in the connections of the armature winding or any complicated or expensive switching equipment. It has the further advantage that there is no change in the magnitude or position of the air gap flux when the change from delta to star connection is made, except insofar as the magnitude of this flux is affected by the armature leakage reactance. Tests have shown that the change cannot be detected on an oscillogram of the voltage between the terminals T4, T5 and T6 when a synchronous machine with this winding is driven as a generator with the winding open circuited. It has been found by tests that a reduction in the starting current of approximately 15% can be obtained with this starting connection, using armature coils with a pitch of 83.3%.

Thus it will be seen that a very simple but very effective arrangement has been provided for reducing the starting current of a polyphase motor, either of the induction or synchronous type. This arrangement, of course, is capable of various modifications and changes without departing from the basic idea of the invention and it is to be understood, therefore, that although a specific embodiment of the invention has been illustrated and described, it is not limited to the particular arrangement shown, but includes all equivalent embodiments and modifications which come within the scope of the appended claims.

I claim as my invention:

1. A three-phase, alternating current motor having a normally star-conected primary winding, each phase of said winding comprising a plurality of armature coils connected together in two parallel branches, the coils of each branch being uniformly distributed around the entire circumference of the motor, each of said branches being connected at one end to one of the parallel branches of another phase and to a neutral point to form a parallel star connection, and means for interrupting the connections to the neutral point during at least part of the starting period.

2. A three-phase, alternating current motor having a normally star-connected primary winding, each phase of said winding comprising a plurality of armature coils connected together in two parallel branches, the coils of each branch being uniformly distributed around the entire circumference of the motor, each of said branches being connected at one end to one of the parallel branches of another phase and to a neutral point to form a parallel star connection, and switch means interposed in the connections to the neutral point to interrupt them during the starting period.

3. A three-phase, alternating current motor having a normally star-connected primary winding, each phase of said winding comprising a plurality of armature coils connected together in two parallel branches, the coils of each branch being uniformly distributed around the entire circumference of the motor, each of said branches being connected at one end to one of the parallel branches of another phase, a connection from each of the junction points between phases to a neutral point to form a parallel star connection and means to interrupt said connections.

4. A three-phase, alternating current motor having a normally star-connected primary winding, each phase of said winding comprising a plurality of armature coils connected together in two parallel branches, the coils of each branch being uniformly distributed around the entire circumference of the motor, each of said branches being connected at one end to one of the parallel branches of another phase, a connection from each of the junction points between phases to a neutral point to form a parallel star connection, and means to interrupt at least two of said connections.

5. A three-phase, alternating current motor having a normally star-connected primary winding, each phase of said winding comprising a plurality of armature coils connected together in two parallel branches, the coils of each branch being uniformly distributed around the entire circumference of the motor, each of said branches being connected at one end to one of the parallel branches of another phase, a connection from each of the junction points between phases to a neutral point to form a parallel star connection, and a two-pole switch to interrupt two of said connections.

6. In an alternating current motor, a polyphase primary winding, each phase of the winding having two sections and each section comprising a plurality of armature coils uniformly distributed around the entire circumference of the motor, means for connecting the winding in star with the two sections of each phase in parallel during operation of the motor, and means for changing to a delta connection with all the winding sections in series during at least a part of the starting period.

7. In an alternating current motor, a polyphase primary winding, each phase of the winding having two sections and each section comprising a plurality of armature coils uniformly distributed around the entire circumference of the motor, means for connecting the winding in star with the two sections of each phase in parallel during operation of the motor, and means for changing to a delta connection with winding sections of different phases in series on each side of the delta during at least a part of the starting period.

8. In an alternating current motor, a three-phase primary winding, each phase of the winding having two sections and each section comprising a plurality of armature coils uniformly distributed around the entire circumference of the motor, the coils of the two sections of each phase lying in alternate poles of the winding, means for connecting the winding in star with the two sections of each phase in parallel during operation of the motor, and means for changing to a delta connection with all the winding sections in series during at least a part of the starting period.

9. In an alternating current motor, a three-phase primary winding, each phase of the winding having two sections and each section comprising a plurality of armature coils uniformly distributed around the entire circumference of the motor, the coils of the two sections of each phase lying in alternate poles of the winding, means for connecting the winding in star with the two sections of each phase in parallel during operation of the motor, and means for changing to a delta connection with winding sections of different phases in series on each side of the delta during at least a part of the starting period.

10. In an alternating current motor, a three-phase primary winding, each phase of the winding having two sections and each section comprising a plurality of armature coils uniformly distributed around the entire circumference of the motor, the coils of the two sections of each phase lying in alternate poles of the winding, means for connecting the winding in star with the two sections of each phase in parallel during operation of the motor, and means for changing to a delta connection with the winding sections of different phases which lie adjacent to each other connected in series on each side of the delta during at least a part of the starting period.

CHAS. C. SHUTT.